(12) United States Patent
Ueyama

(10) Patent No.: US 10,943,328 B2
(45) Date of Patent: Mar. 9, 2021

(54) IMAGE CAPTURING APPARATUS, METHOD FOR CONTROLLING SAME, AND STORAGE MEDIUM

(71) Applicant: CANON KABUSHIKI KAISHA, Tokyo (JP)

(72) Inventor: Teruhiko Ueyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 16/535,281

(22) Filed: Aug. 8, 2019

(65) Prior Publication Data
US 2020/0065936 A1    Feb. 27, 2020

(30) Foreign Application Priority Data

Aug. 27, 2018 (JP) .................. 2018-158570

(51) Int. Cl.
*G06T 3/00* (2006.01)
*G06T 5/00* (2006.01)

(52) U.S. Cl.
CPC .......... *G06T 3/0018* (2013.01); *G06T 3/0062* (2013.01); *G06T 5/006* (2013.01); *G06T 2207/20212* (2013.01)

(58) Field of Classification Search
CPC .................................................. G06T 3/0018
USPC ...................................................... 382/302
See application file for complete search history.

(56) References Cited

U.S. PATENT DOCUMENTS

| | | | |
|---|---|---|---|
| 2001/0014215 A1* | 8/2001 | Ide | G02B 7/34 396/96 |
| 2010/0007766 A1* | 1/2010 | Ogawa | H04N 5/2355 348/229.1 |
| 2013/0278809 A1* | 10/2013 | Itoh | H04N 5/23219 348/333.01 |
| 2014/0247376 A1* | 9/2014 | Kuwata | H04N 5/3572 348/241 |
| 2015/0222816 A1* | 8/2015 | Shohara | H04N 5/235 348/38 |
| 2016/0088207 A1* | 3/2016 | Yamamoto | G06T 5/008 348/362 |
| 2016/0321509 A1* | 11/2016 | Okada | G06K 9/6267 |

(Continued)

FOREIGN PATENT DOCUMENTS

| | | |
|---|---|---|
| JP | 2013-198070 A | 9/2013 |
| JP | 2016-058840 A | 4/2016 |
| WO | 2016/038886 A1 | 3/2016 |

*Primary Examiner* — David T Welch
(74) *Attorney, Agent, or Firm* — Venable LLP

(57) ABSTRACT

An image capturing apparatus includes an image capturing device, a photometry unit; and an exposure control unit, wherein, when a wide-angle image is acquired, the photometry unit divides the wide-angle image into a plurality of regions, and acquires a first photometric result of a first photometric region and a second photometric result of a second photometric region, the first photometric region and the second photometric region being obtained by bringing adjacent predetermined regions together, when a wide-angle image is acquired, the exposure control unit controls an exposure based on at least the first photometric result and the second photometric result, and the first photometric region is constituted by a region included in the second photometric region and a region that is not included in the second photometric region.

14 Claims, 10 Drawing Sheets

(56) References Cited

U.S. PATENT DOCUMENTS

2019/0082092 A1\* 3/2019 Ono ................ H04N 5/232933
2019/0260928 A1\* 8/2019 Kunishige ............. G06T 3/0018

\* cited by examiner

IMAGE OF FRONT CAMERA  IMAGE OF REAR CAMERA

IMAGE CONVERSION (E.G. CYLINDRICAL PROJECTION)

PHOTOMETRIC VALUE Ev15 = PHOTOMETRIC VALUE Ev13

IMAGE COMBINING

DIFFERENCE IN LUMINANCE LEVEL OCCURS AT BORDER OF IMAGES

ADJUST LUMINANCE AT BORDER PORTIONS OF IMAGES

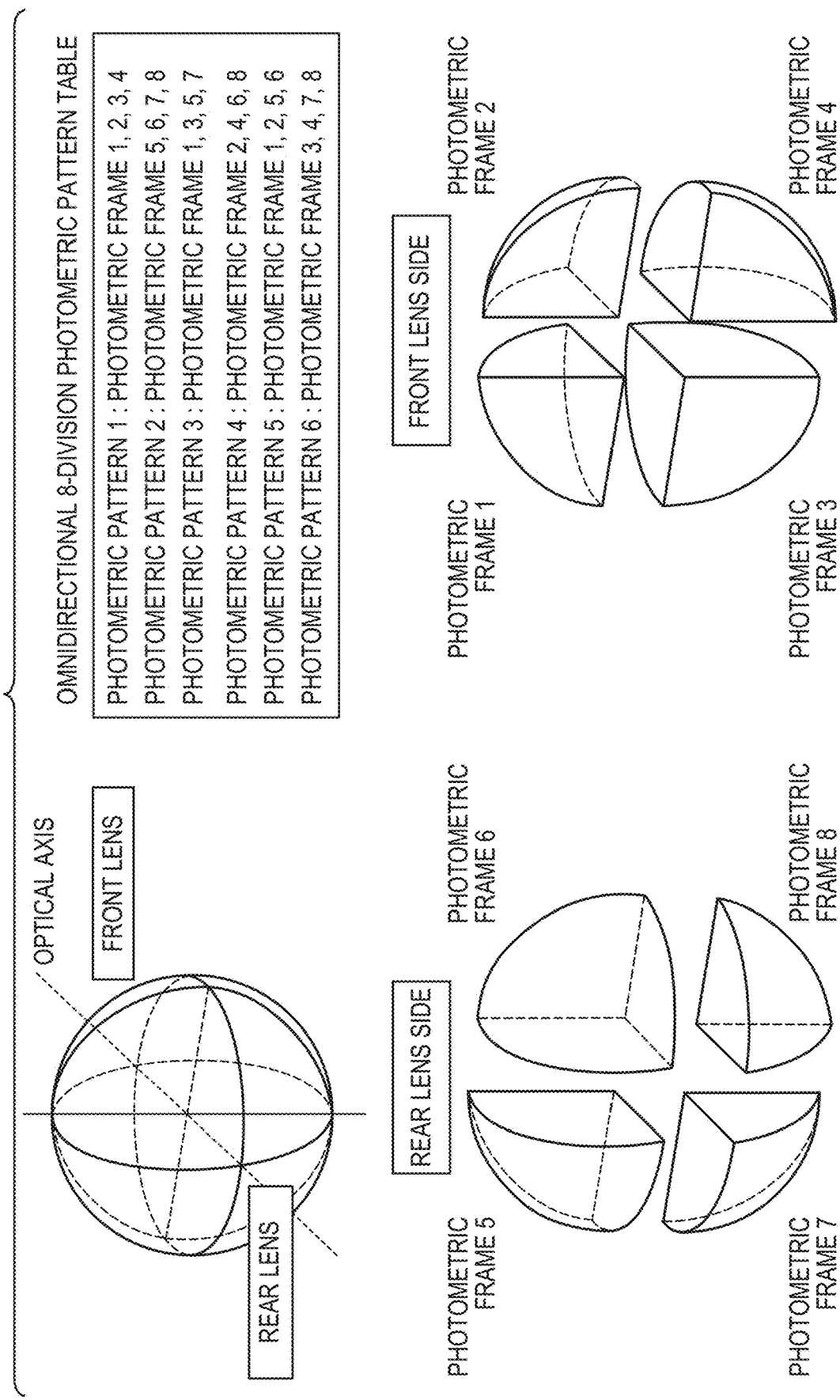

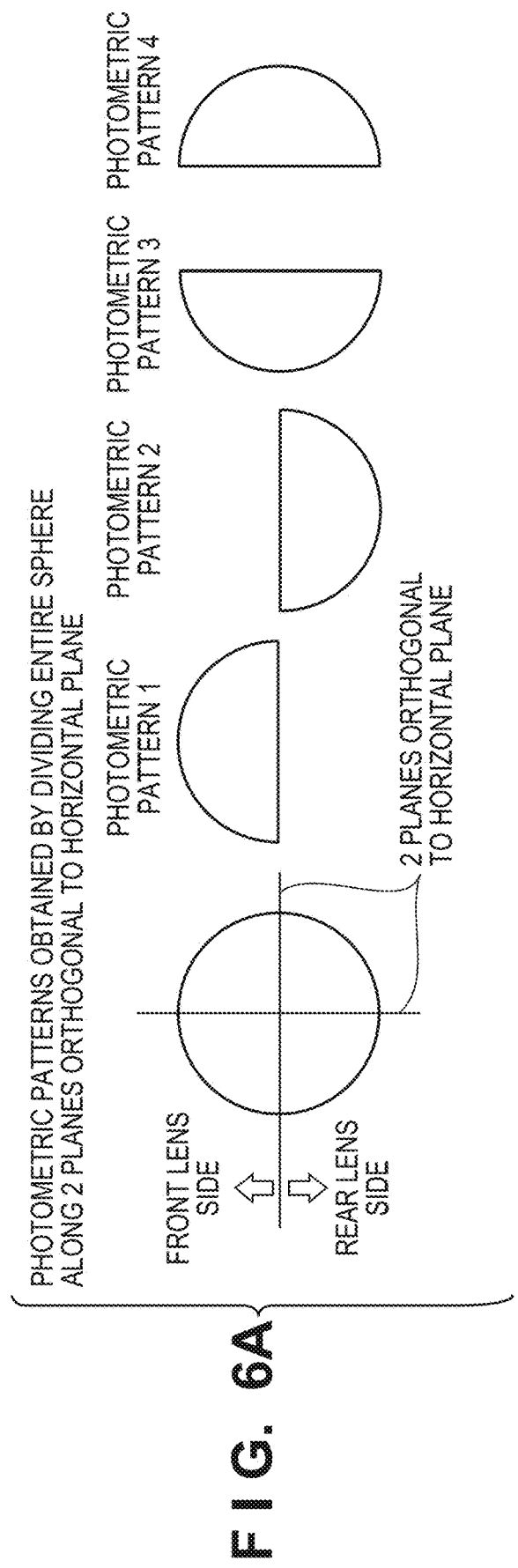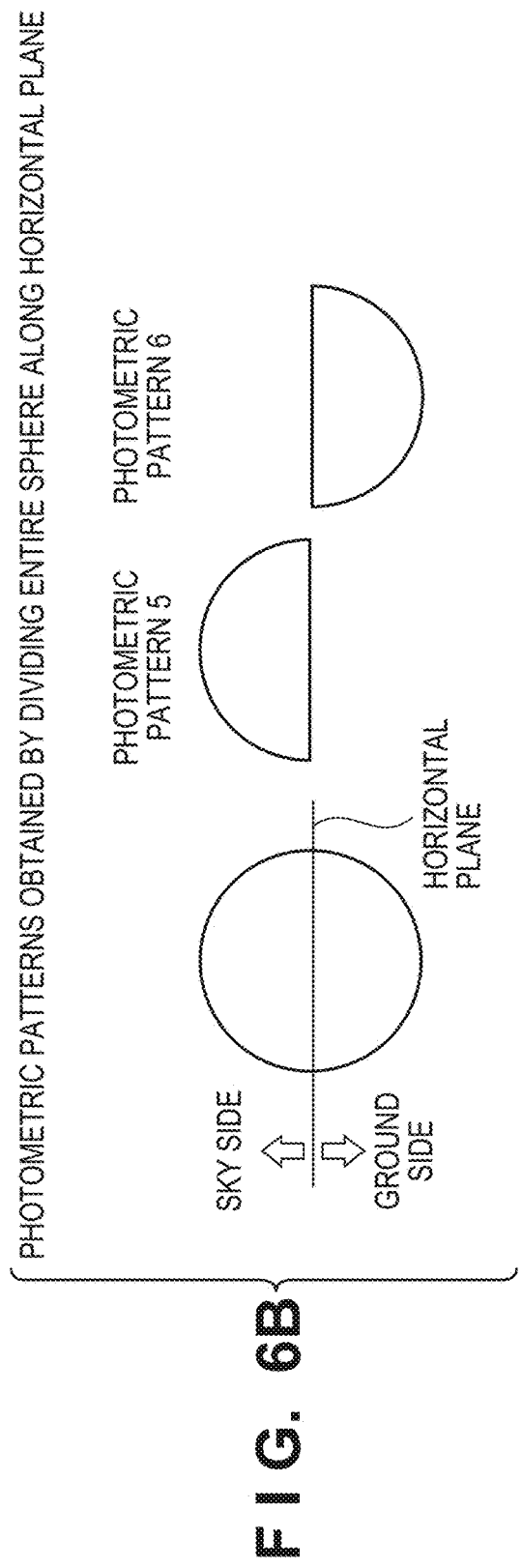

PHOTOMETRIC RESULTS OF PHOTOMETRIC PATTERNS 5 AND 6 ARE AT SAME LEVEL

PHOTOMETRIC RESULT OF PHOTOMETRIC PATTERN 5 IS BRIGHTER THAN THAT OF PHOTOMETRIC PATTERN 6

PHOTOMETRIC RESULT OF PHOTOMETRIC PATTERN 6 IS BRIGHTER THAN THAT OF PHOTOMETRIC PATTERN 5

IMAGE CAPTURING APPARATUS, METHOD FOR CONTROLLING SAME, AND STORAGE MEDIUM

BACKGROUND OF THE INVENTION

Field of the Invention

The present invention relates to an image capturing apparatus capable of capturing an omnidirectional image, and a method for controlling the same.

Description of the Related Art

Conventionally, an image capturing apparatus that includes a plurality of image capturing means and is capable of capturing (acquiring) a wide-angle image such as an omnidirectional image is known. Usually, in such an image capturing apparatus, it is difficult to check a wide image capturing range such as the entire sphere at one time, and thus a display monitor is often omitted. Thus, it is difficult to capture an image after having checked the exposure for the entire image capturing range, and thus an image is usually captured under exposure conditions adjusted by a camera.

However, in a case of an image capturing apparatus in which a plurality of image capturing means each perform photometry and imaging only in the respective image capturing ranges, and a wide-angle image is combined, it is difficult for this image capturing apparatus to evaluate the brightness of the entire wide image capturing range and determine exposure conditions, and thus it is difficult to obtain photometric results that are optimal for each imaging scene. Thus, in a case where the captured image is checked later, there is a high probability that an estimated exposure result has not been obtained. Also, a camera that captures an omnidirectional image by combining images captured in a plurality of optical systems is a problematic in that the exposure varies depending on the orientation of the image capturing apparatus, even at the same image capturing position.

In order to solve this problem, Japanese Patent Laid-Open No. 2016-58840 proposes a technique by which omnidirectional images that have been respectively captured in a plurality of optical systems are divided into a plurality of image regions and scene determination is made for each of the divided images, and image processing is performed using correction parameters according to scenes.

Japanese Patent Laid-Open No. 2013-198070 proposes a technique by which the position of the sun is detected from an omnidirectional image, a back-lit region of a captured image is specified with high accuracy, and backlight correction is performed.

However, there is a problem that, in a case where scene determination is performed on a predetermined region of an image of a wide image capturing range such as the entire sphere, and image processing according to scenes is locally performed, partial deterioration of the image is discernible. Thus, the predetermined region on which image processing is performed needs to be in a range with a pixel signal having a good S/N ratio. In this manner, exposure control under which a wide-angle image is captured has various problems, and there is a demand for an image capturing apparatus provided with higher photometric performance for an image region of a main subject, regardless of the orientation of an image capturing apparatus and an imaging scene.

SUMMARY OF THE INVENTION

The present invention has been made in view of the above-described issues, and provides an image capturing apparatus capable of performing appropriate exposure control in a case where a wide-angle image such as an omnidirectional image is acquired.

According to a first aspect of the present invention, there is provided an image capturing apparatus comprising: an image capturing device configured to capture an image of a subject; at least one processor or circuit configured to function as the following units: a photometry unit configured to perform photometry on the subject based on the image obtained using the image capturing device; and an exposure control unit configured to control an exposure used when an image of the subject is captured to acquire the image, based on a result of photometry performed by the photometry unit, wherein, when a wide-angle image is acquired using the image capturing device, the photometry unit divides the wide-angle image into a plurality of regions, and acquires a first photometric result of a first photometric region and a second photometric result of a second photometric region, the first photometric region and the second photometric region being obtained by bringing adjacent predetermined regions together, out of the plurality of regions, when a wide-angle image is acquired, the exposure control unit controls an exposure used when the wide-angle image is acquired, based on at least the first photometric result and the second photometric result, and the first photometric region is constituted by a region included in the second photometric region and a region that is not included in the second photometric region, out of the plurality of regions.

According to a second aspect of the present invention, there is provided a method for controlling an image capturing apparatus provided with an image capturing device configured to capture an image of a subject, the method comprising: performing photometry on the subject based on the image obtained using the image capturing device; controlling an exposure used when an image of the subject is captured to acquire the image, based on a result of photometry, wherein, in the photometry, when a wide-angle image is acquired using the image capturing device, the wide-angle image is divided into a plurality of regions, and a first photometric result of a first photometric region and a second photometric result of a second photometric region are acquired, the first photometric region and the second photometric region being obtained by bringing adjacent predetermined regions together, out of the plurality of regions, wherein, in the exposure control, when a wide-angle image is acquired, an exposure used when the wide-angle image is acquired is controlled based on at least the first photometric result and the second photometric result, and wherein the first photometric region is constituted by a region included in the second photometric region and a region that is not included in the second photometric region, out of the plurality of regions.

Further features of the present invention will become apparent from the following description of exemplary embodiments with reference to the attached drawings.

BRIEF DESCRIPTION OF THE DRAWINGS

FIG. 4 is a diagram showing combinations of photometric frames obtained by dividing an omnidirectional image.

FIGS. 6A and 6B are schematic diagrams of photometric patterns in one embodiment.

DESCRIPTION OF THE EMBODIMENTS

Figure 1:
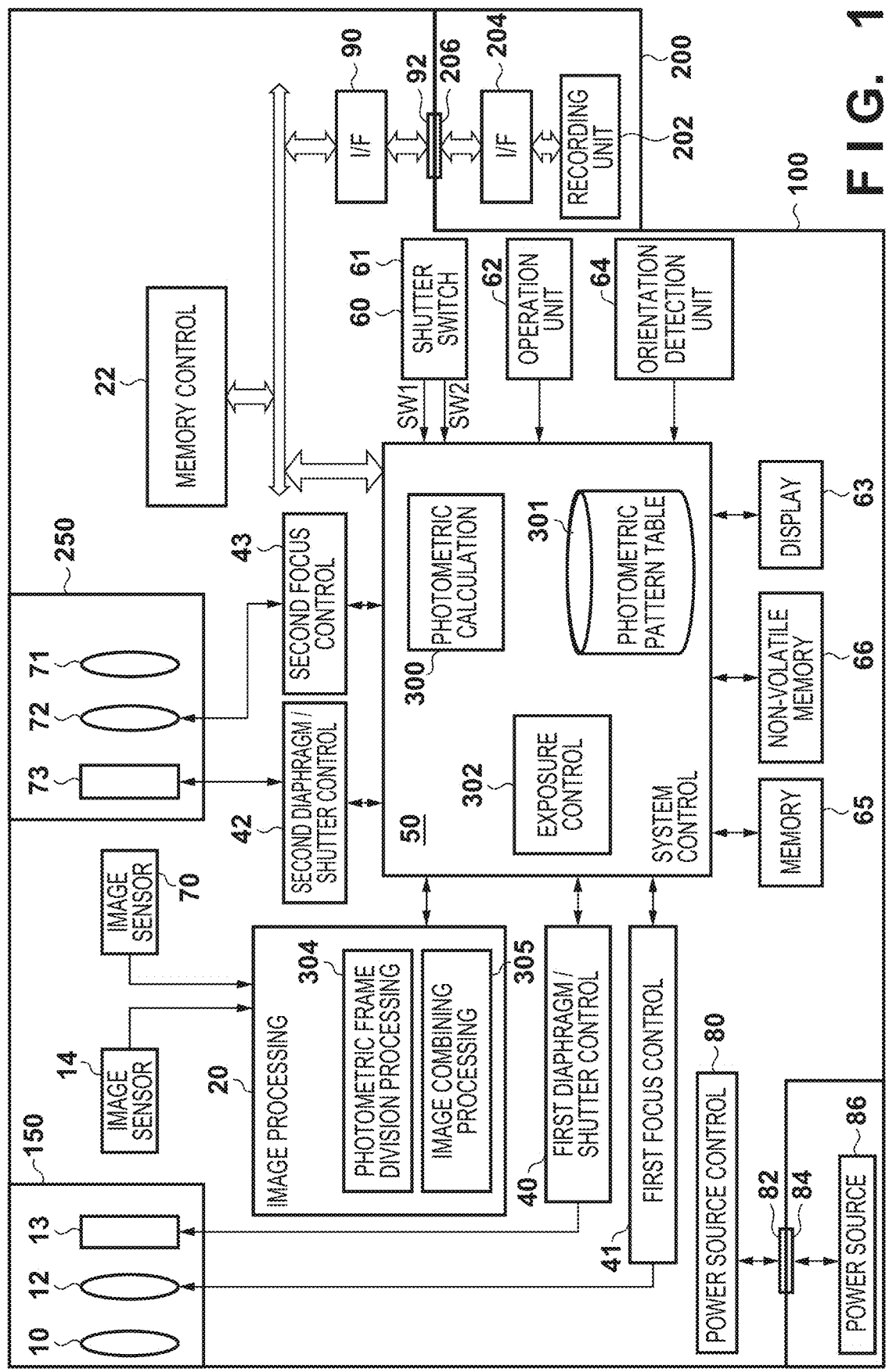
FIG. 1 is a block diagram showing a configuration of an image capturing apparatus according to one embodiment of the present invention.

Hereinafter, one embodiment of the present invention will be described in detail with reference to the attached drawings. FIG. 1 is a block diagram showing a configuration of an image capturing apparatus 100 according to one embodiment of the present invention.

In FIG. 1, the image capturing apparatus 100 includes a plurality of lens barrels, and is capable of imaging over an omnidirectional angle of view by combining images captured by these lens barrels.

A first lens barrel 150 houses a lens group. A lens 10 is capable of imaging a portion of the angle of view range of an omnidirectional image, and a focus adjustment lens 12 moves in the direction of the optical axis of the lens barrel 150 and thereby performs focus adjustment. Also, a diaphragm and shutter 13 performs light quantity adjustment for exposure control.

A second lens barrel 250 houses a lens group. A lens 71 is capable of imaging a portion of the angle of view range of an omnidirectional image, and a focus adjustment lens 72 moves in the direction of the optical axis of the lens barrel 250 and thereby performs focus adjustment. Also, a diaphragm and shutter 73 performs light quantity adjustment for exposure control.

Note that, although the image capturing apparatus 100 is configured such that the first lens barrel 150, the second lens barrel 250, and a camera main body are integrated in this embodiment, the configuration of the image capturing apparatus 100 is not limited thereto. This embodiment can be applied to an image capturing system constituted by a camera main body and an interchangeable lens that can be detachable from the camera main body.

An image sensor 14 receives light that has passed through the first lens barrel 150, converts a subject image into electrical signals, and thus generates image capturing signals. The image sensor 14 is constituted by a CCD (charge-coupled device) image sensor or a CMOS (complementary metal-oxide semiconductor) image sensor and the like.

An image sensor 70 receives light that has passed through the second lens barrel 250, converts a subject image into electrical signals, and thus generates image capturing signals. The image sensor 70 is constituted by a CCD (charge-coupled device) image sensor or a CMOS (complementary metal-oxide semiconductor) image sensor and the like.

The image capturing signals generated by the image sensor 14 and the image sensor 70 are input to an image processing unit 20, and various types of image processing such as pixel interpolation processing or color conversion processing are performed. Also, the image processing unit 20 includes an image combining processing unit 305 that combines images captured by the image sensor 14 and the image sensor 70 to generate an omnidirectional image, and a photometric frame division processing unit 304 that divides the omnidirectional image generated using the images captured by the image sensor 14 and the image sensor 70 by any number or size.

Image data generated through imaging processing is sent to and recorded in a recording unit 202 via an interface unit 90 and a connector 92 provided in the image capturing apparatus 100 and an interface unit 204 and a connector 206 provided in an external recording medium 200. Image data is recorded in the external recording medium 200 or a non-volatile memory 66, or is recorded in both the external recording medium 200 and the non-volatile memory 66. The external recording medium 200 is a memory card or the like used by being mounted on the image capturing apparatus 100. The non-volatile memory 66 is a storage medium built into the image capturing apparatus 100. The memory 65 stores information such as settings of the image capturing apparatus 100, in addition to program data and image data.

Also, the image capturing apparatus 100 includes an operation unit 62 including a touch panel and an operation switch for designating a subject or setting the image capturing apparatus 100, for example, in addition to a shutter switch 60 for giving an instruction to start photometry or perform focus adjustment and a shutter switch 61 for giving an instruction to start imaging.

An orientation detection unit 64 is a detection unit for detecting the orientation and the tilt angle of the image capturing apparatus 100 from a change in the output from a sensor such as an acceleration sensor or a gyro sensor, and information regarding the orientation of the image capturing apparatus 100 is also used in image processing performed on data of a captured image.

A system controller 50 includes a computation unit such as a CPU (central processing unit). The system controller 50 performs overall control of the image capturing apparatus 100 by transmitting control commands to units according to user operations. The system controller 50 executes various control programs stored in the memory 65, such as programs for performing control and exposure control of the image sensor 14 and the image sensor 70, and performing focus adjustment control, for example.

A photometric calculation unit 300 provided in the system controller 50 calculates a photometric value and an exposure control value (an aperture value and shutter speed) using data of the image that has been captured by the image sensor 14 and subjected to image processing in the image processing unit 200. A first diaphragm shutter controller 40 controls the diaphragm and shutter 13 based on photometric results. The diaphragm and shutter 13 is constituted by actuators such as a stepping motor and an electromagnetic plunger, and a drive circuit for driving them, and drives diaphragm blades and shutter blades.

A first focus controller 41 performs contrast autofocus adjustment (AF) control. That is, the first focus controller 41 controls the focus adjustment lens 12 based on focus adjustment information (contrast evaluations values) of imaging optical systems obtained through image processing performed by the image processing unit 20 to bring a subject into focus. A driving unit of the focus adjustment lens 12 includes an actuator such as a voice coil motor (VCM), a position detection sensor for feeding back the position of the focus adjustment lens 12, and a drive circuit for driving them.

Also, as another configuration, a configuration may be adopted in which a position detection sensor is not included, as in a stepping motor, for example. In this embodiment, the driving unit of the focus adjustment lens 12 may have any configuration. Also, a phase-difference AF method may be used to perform AF control other than a contrast AF method, or AF control may be performed using a plurality of methods, such as a combination of a contrast method and another method. When the first focus controller 41 performs AF control, the first focus controller 41 performs a scan operation by moving the focus adjustment lens 12 in a predetermined range. A focus position, which is a focusing point, is detected using a contrast evaluation value and the like obtained during the scan operation. Also, as another configuration, a configuration is possible in which the lens barrel 150 is a pan focus lens and no focus adjustment lens 12 is included.

The photometric calculation unit 300 provided in the system controller 50 calculates a photometric value and an exposure control value (an aperture value and shutter speed) using data of the image that has been captured by the image sensor 70 and subjected to image processing in the image processing unit 200. A second diaphragm shutter controller 42 controls the diaphragm and shutter 73 based on photometric results. The diaphragm and shutter 73 is constituted by actuators such as a stepping motor and an electromagnetic plunger, and a drive circuit for driving them, and drives diaphragm blades and shutter blades.

A second focus controller 43 performs contrast autofocus adjustment (AF) control. That is, the second focus controller 43 controls the focus adjustment lens 72 based on focus adjustment information (contrast evaluations values) of imaging optical systems obtained through image processing performed by the image processing unit 20 to bring a subject into focus. A driving unit of the focus adjustment lens 72 includes an actuator such as a voice coil motor (VCM), a position detection sensor for feeding back the position of the focus adjustment lens 72, and a drive circuit for driving them.

Also, as another configuration, a configuration may be adopted in which a position detection sensor is not included, as in a stepping motor, for example. In this embodiment, the driving unit of the focus adjustment lens 72 may have any configuration. Also, a phase-difference AF method may be used to perform AF control other than a contrast AF method, or AF control may be performed using a plurality of methods, such as a combination of a contrast method and another method. When the second focus controller 43 performs AF control, the second focus controller 43 performs a scan operation by moving the focus adjustment lens 72 in a predetermined range. A focus position, which is a focusing point, is detected using a contrast evaluation value and the like obtained during the scan operation. Also, as another configuration, a configuration is possible in which the lens barrel 250 is a pan focus lens and no focus adjustment lens 72 is included.

Here, the image processing unit 20 performs photometric calculations by processing data of images captured by the image sensor 14 and the image sensor 70 via the first lens barrel 150 and the second lens barrel 250 at the same time. The data of images that are respectively captured by the image sensor 14 and the image sensor 70 is combined by an image combining processing unit 305 provided in the image processing unit 20, and this combined image is divided by the photometric frame division processing unit 304 by any size or number. Data of these divided images is used by the photometric calculation unit 300 to calculate a photometric value for each pattern of combinations of the divided images in accordance with information regarding a photometric pattern table 301 provided in the system controller 50. An appropriate exposure value of an omnidirectional image is obtained by an exposure control unit 302 from the calculation results of these photometric values.

Figure 2:
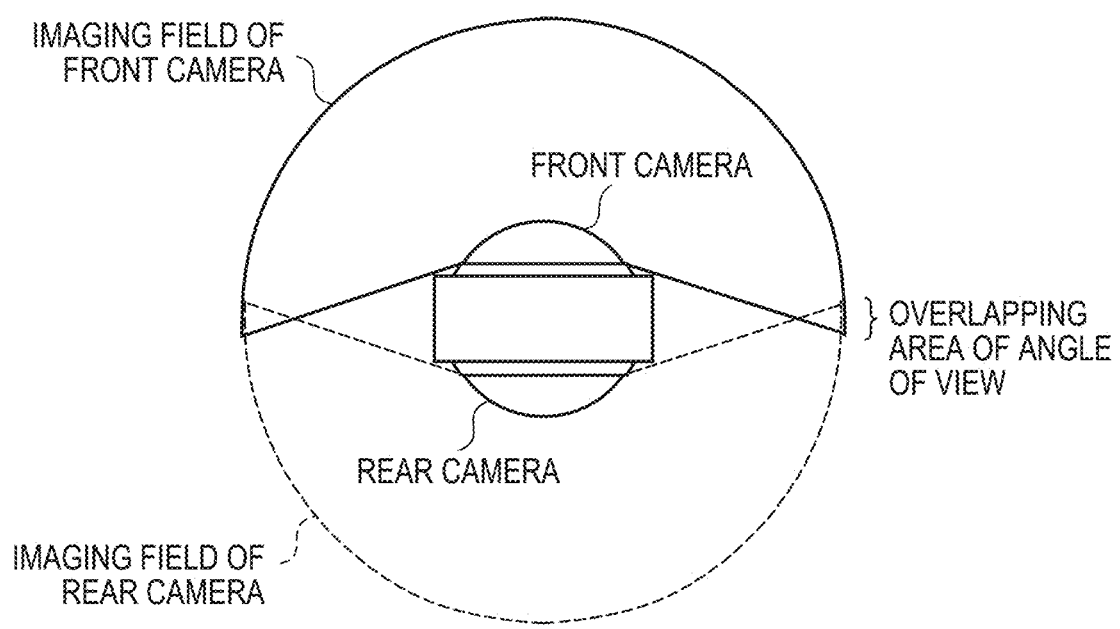
FIG. 2 is a schematic diagram showing a configuration example of an image capturing apparatus according to one embodiment.

Next, a configuration example of an omnidirectional image capturing apparatus in this embodiment will be described with reference to FIG. 2. In the omnidirectional image capturing apparatus shown in FIG. 2, two image capturing apparatuses (image capturing units) provided with fish-eye lenses having an imaging field (imaging angle of view) of 180 degrees or more are arranged back to back in opposite directions on the same optical axis. Here, it is assumed that one of the image capturing apparatuses is referred to as a front camera, and the other image capturing apparatus disposed in the opposite direction is referred to as a rear camera. The front camera and the rear camera are configured such that border portions of images that can be captured by the respective cameras overlap each other for positioning.

Figure 3A:
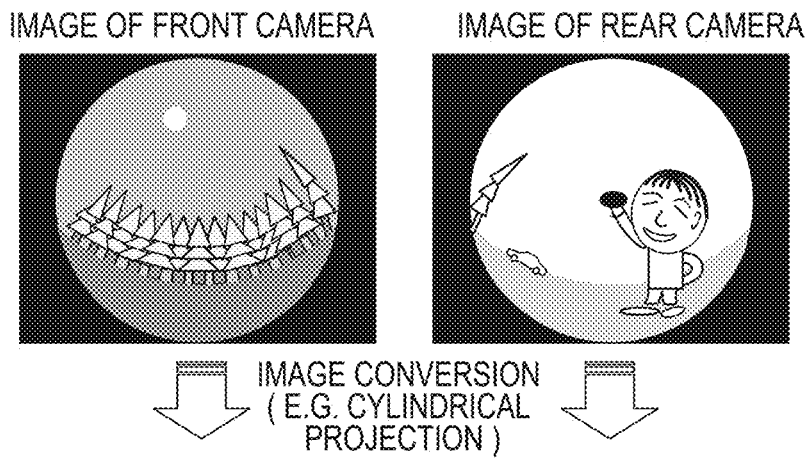
FIGS. 3A to 3D are diagrams showing a conventional method for combining omnidirectional images captured by a plurality of image capturing means.
Figure 3B:
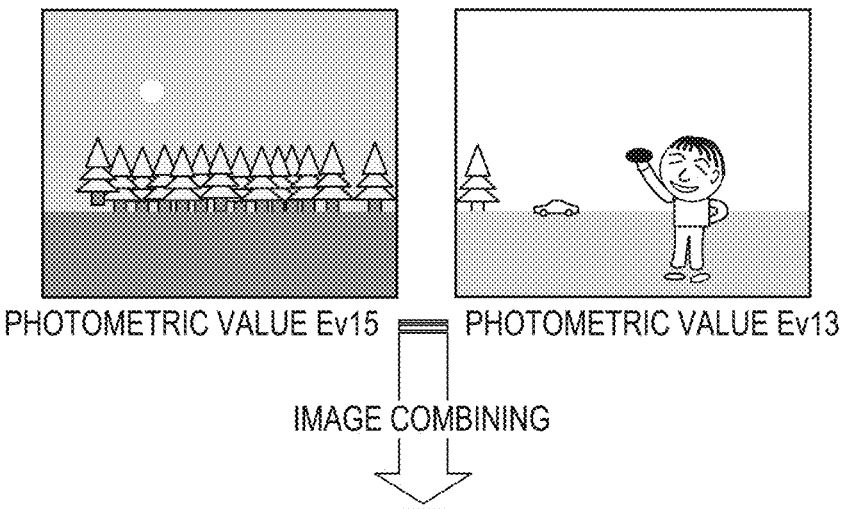
Figure 3C:
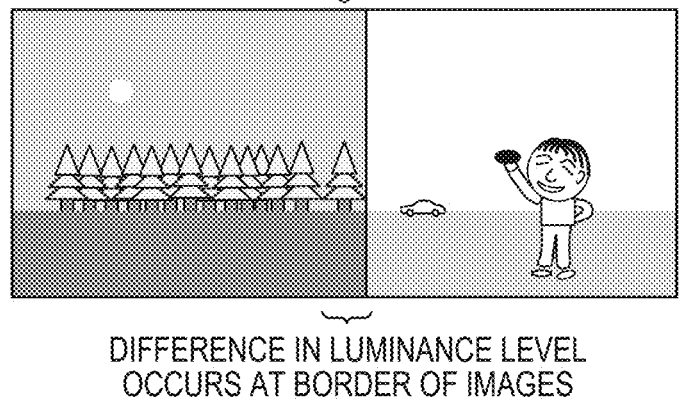
Figure 3D:
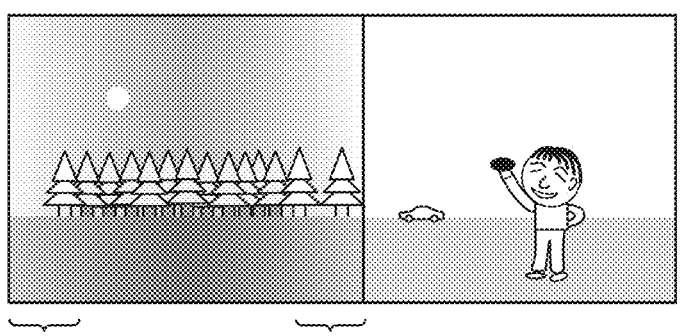

Conventionally, with an omnidirectional image capturing apparatus having such a configuration, as shown in FIGS. 3A to 3D, imaging that is appropriate to each camera is performed (FIG. 3A), and after the images are captured, image conversion such as cylindrical projection is performed on the images that have been respectively captured by the front camera and the rear camera (FIG. 3B). Positioning is then performed on the border portions of the images, and the images are combined (FIG. 3C). In this case, in a case where the images are directly combined, a difference in luminance level may be discernible in the border portions of the images coupled to each other, and thus shading correction and processing for adjusting the gain of border portions of images are performed such that the images have the same brightness, and then the images are combined (FIG. 3D). Although an example in which adjacent one ends of two images are only combined is illustrated in FIGS. 3A to 3D, similar processing is performed on both ends of each image. Conventionally, an omnidirectional image was obtained in this manner. However, with this conventional method, the exposure is determined without considering the situation around an imaging scene, and thus a main subject which a user photographer intends to image cannot be imaged with appropriate exposure in some cases.

In view of this, in this embodiment, the omnidirectional image is divided into a plurality of photometric frames, and a photometric pattern obtained by combining these photometric frames is defined in accordance with a photometric intention. FIG. 4 is a diagram showing examples of photometric frames and six types of photometric patterns in a case where exposure conditions are determined using the photometric patterns using photometric frames obtained by dividing the entire sphere into eight.

As one example, in the following description, the photometric frames will be described as regions obtained by dividing the entire sphere into eight along a plane passing through the center of the entire sphere and horizontally dividing the entire sphere into two in the vertical direction, a plane orthogonal to the horizontal plane and passing through the optical axis, and a plane orthogonal to the horizontal plane and the optical axis.

In this embodiment, with regard to a case where definitions of a photometric pattern are defined as follows, the flow for calculating photometric results of an omnidirectional image will be described.

Photometric Pattern 1: an imaging region in the direction of the optical axis of a front lens is subjected to photometry Photometric Pattern 2: an imaging region in the direction of the optical axis of a rear lens is subjected to photometry Photometric Pattern 3: an imaging region in the direction of the left side of a camera is subjected to photometry Photometric Pattern 4: an imaging region in the direction of the right side of the camera is subjected to photometry Photometric Pattern 5: an imaging region in the sky direction is subjected to photometry Photometric Pattern 6: an imaging region in the ground direction is subjected to photometry The photometric pattern 1 indicates a region obtained by dividing a range captured in the direction of the optical axis of the front lens into four, and as illustrated in FIG. 4, combining a photometric frame 1, a photometric frame 2, a photometric frame 3, and a photometric frame 4. The photometric pattern 2 indicates a region obtained by dividing a range captured in the direction of the optical axis of the rear lens into four, and as illustrated in FIG. 4, combining a photometric frame 5, a photometric frame 6, a photometric frame 7, and a photometric frame 8. The photometric pattern 3 indicates a region obtained by dividing a range captured in the direction of the left side of the camera into four, and as illustrated in FIG. 4, combining the photometric frame 1, the photometric frame 3, the photometric frame 5, and the photometric frame 7. The photometric pattern 4 indicates a region obtained by dividing a range captured in the direction of the right side of the camera into four, and as illustrated in FIG. 4, combining the photometric frame 2, the photometric frame 4, the photometric frame 6, and the photometric frame 8. The photometric pattern 5 indicates a region obtained by dividing a range captured in the sky direction into four, and as illustrated in FIG. 4, combining the photometric frame 1, the photometric frame 2, the photometric frame 5, and the photometric frame 6. The photometric pattern 6 indicates a region obtained by dividing a range captured in the ground direction into four, and as illustrated in FIG. 4, combining the photometric frame 3, the photometric frame 4, the photometric frame 7, and the photometric frame 8.

As described above, as a result of combining a predetermined number of photometric frames, the photometric patterns are set such that the photometric patterns partially overlap each other. Accordingly, it is possible to calculate photometric results in consideration of the influence of ambient brightness that is highly relevant, without determining the exposure using only a photometric result of each photometric pattern.

Note that, although in the above description, photometry is performed on each photometric pattern, instead of performing photometry on each of the photometric frames 1 to 8, a configuration may be adopted in which photometry is performed on each of the photometric frames 1 to 8 and a photometric value of each photometric pattern is calculated from a photometric result of each photometric frame.

Figure 5:
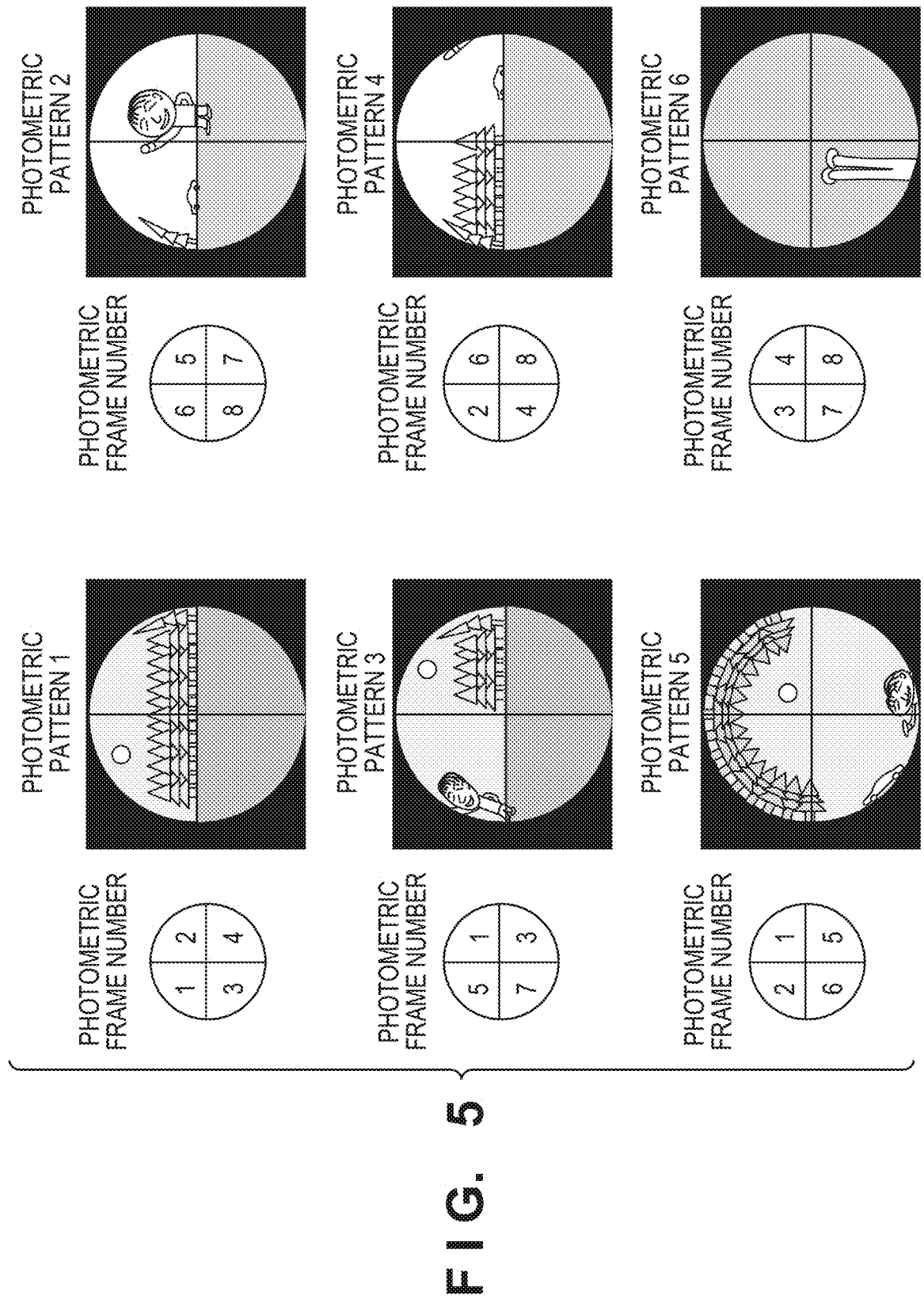
FIG. 5 is a diagram illustrating examples of photometric patterns in one embodiment.

Here, assume that the sun is present in the direction of the photometric frame 1 as in FIG. 5, for example. In this case, the photometric pattern 1 and the photometric pattern 3 include the sun and thus bright photometric results are obtained, but the photometric results of the photometric pattern 2 and the photometric pattern 4 are darker than those of the photometric pattern 1 and the photometric pattern 3. Similarly, when the photometric pattern 5 is compared with the photometric pattern 6, a brighter photometric result is obtained in the photometric pattern 5. Accordingly, it is possible to estimate that a subject with high luminance is present in the direction of the photometric frame 1, and the direction of the photometric frames 6 and 8 is in a direction for receiving light, and thus out of the photometric patterns 1 to 4, the photometric results of the photometric pattern 2 and the photometric pattern 4 that include the photometric frame 6 and the photometric frame 8 are considered important and the exposure for the entire sphere is determined.

In addition to the above-described imaging scene, an example in which luminance analysis for determining the exposure for the entire sphere from the photometric results of each of the photometric patterns is performed will be described with reference to FIGS. 6A to 8C.

FIGS. 6A and 6B are schematic diagrams illustrating photometric patterns for determining a scene from ambient brightness at the time of imaging and photometric patterns for determining a scene from the brightness of the sky and the ground at the time of imaging.

FIG. 6A is a schematic diagram of a photometric pattern for determining an ambient scene at the time of imaging, showing a top view of the entire sphere, which is shown in FIG. 4, constituted by four photometric patterns (the photometric patterns 1, 2, 3, and 4) obtained by dividing the entire sphere along two planes orthogonal to the horizontal plane. On the other hand, FIG. 6B is a schematic diagram of photometric patterns for determining a scene in the sky-ground direction at the time of imaging, the entire sphere, which is shown in FIG. 4, constituted by two photometric patterns (the photometric patterns 5 and 6) obtained by dividing the entire sphere along the horizontal plane being viewed from the side in the horizontal direction. This embodiment will be described below with reference to the schematic diagrams shown in FIGS. 6A and 6B.

Figure 7A:
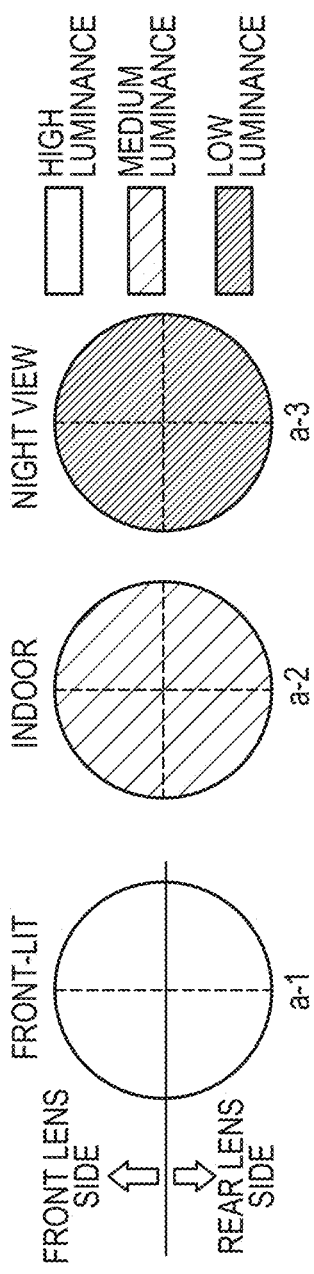
FIGS. 7A to 7C are diagrams showing examples of photometric values of each photometric pattern for evaluating ambient brightness of an omnidirectional image.
Figure 7B:
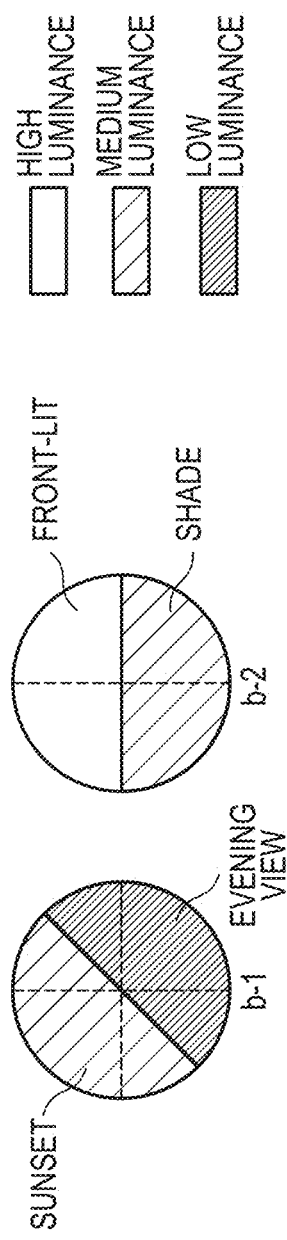
Figure 7C:

FIGS. 7A to 7C are diagrams illustrating an example of four photometric patterns obtained by dividing the entire sphere along two planes orthogonal to the horizontal plane.

FIG. 7A is an example of the case where the photometric results of the four photometric patterns are at the same level. When luminance levels of photometric results are classified into three luminance ranges, namely, high luminance, medium luminance, and low luminance, a-1 is a subject with high luminance in all the ranges, and thus it is estimated that a light source is present in the zenith direction. On the other hand, a-2 is a subject with medium luminance in all the ranges, and thus an indoor environment is estimated. Similarly, a-3 is a subject with low luminance in all the ranges, and thus a dark scene such as a night view is estimated. In such a case, it is sufficient that an average value of the photometric values of the four photometric patterns is regarded as a photometric value.

FIG. 7B is an example of the case where the photometric results of the two photometric patterns are at the same level. For example, b-1 is a subject in which medium luminance is obtained in the photometric patterns 1 and 3 and the photometric results of the photometric patterns 1 and 3 are at the same level, and in which low luminance is obtained in the photometric patterns 2 and 4 and the photometric results of the photometric patterns 2 and 4 are at the same level. This example is estimated to be a scene in which the sky in the direction opposite to the setting sun is a dark evening view, for example. In this case, it is sufficient that the photometric results of the photometric patterns 1 and 3 including the direction of the setting sun are considered important.

b-2 is a subject in which high luminance is obtained in the photometric pattern 1 and medium luminance is obtained in the photometric pattern 2, and in which the luminance of the photometric pattern 3 and the luminance of the photometric pattern 4 are at the same level. In this scene, a front-lit environment is located in the direction of the photometric pattern 1 and the light source is present in the direction of the photometric pattern 2, and thus it is estimated that a back-lit subject is present. In this case, it is sufficient that the photometric result of the photometric pattern 1 in the front-lit direction is considered important.

FIG. 7C is an example of the case where the photometric results of the four photometric patterns are different from each other. For example, with c-1, it is estimated that a dark subject is present in a region where the photometric pattern 2 and the photometric pattern 4 overlap each other, and thus it is sufficient that photometric results of photometric patterns that do not include this region are considered important.

Although the photometric patterns for determining an ambient scene at the time of imaging have been described above with reference to FIGS. 7A to 7C, combinations of photometric values of photometric patterns, scene determination conditions, and the like are not limited to the above description. As a result of analyzing more imaging scenes and increasing the number of photometric patterns, accuracy in photometry can be further increased.

Figure 8A:
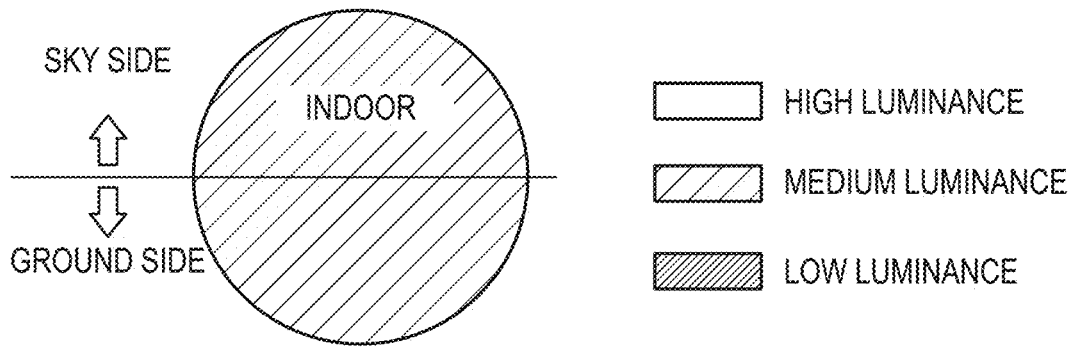
FIGS. 8A to 8C are diagrams showing examples of photometric values of each photometric pattern for evaluating brightness of the sky and the ground of an omnidirectional image.
Figure 8B:
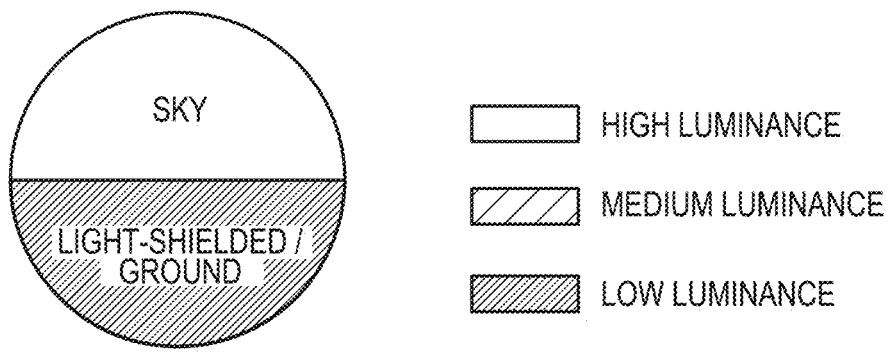
Figure 8C:
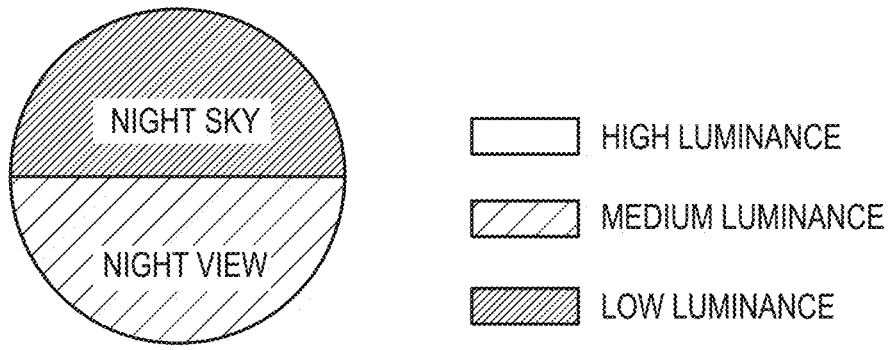

FIGS. 8A to 8C are diagrams illustrating an example of two photometric patterns obtained by dividing the entire sphere along the horizontal plane.

FIG. 8A shows an example in which the photometric results of the two photometric patterns are at the same level, and the photometric result of the photometric pattern 5, which represents the sky side, and the photometric result of the photometric pattern 6, which represents the ground, indicate medium luminance and are at the same level, and thus an indoor environment or the like is estimated. In this case, the photometric results calculated from the photometric patterns 1, 2, 3, and 4 are considered important.

FIG. 8B shows an example in which the sky side has high luminance and the ground has low luminance, and the photometric result of the photometric pattern 5 indicates to be brighter than the photometric result of the photometric pattern 6, and thus it is estimated that the sky is imaged as a main subject. In this case, a photometric value is calculated by weighting the photometric results calculated from the photometric patterns 1, 2, 3, and 4, with the photometric result of the photometric pattern 5 being considered important.

FIG. 8C shows an example in which the sky side has low luminance and the ground has medium luminance, and the photometric result of the photometric pattern 6 indicates to be brighter than the photometric result of the photometric pattern 5, and thus it is estimated that a night scene or the like is imaged. In this case, a photometric value is calculated by weighting the photometric results calculated from the photometric patterns 1, 2, 3, and 4, with the photometric result of the photometric pattern 6 being considered important.

Although the photometric patterns for determining a scene in the sky-ground direction at the time of imaging have been described above with reference to FIGS. 8A to 8C, combinations of photometric values of photometric patterns, scene determination conditions, and the like are not limited to the above description. Also, although the photometric results of the photometric patterns in the sky-ground direction have been described as the role of correcting photometric values with respect to photometric results of photometric patterns in an ambient direction, as a result of analyzing more imaging scenes and increasing the number of photometric patterns, accuracy in photometry can be further increased. Also, a scene for which detection of appropriate exposure can be detected only using photometric results of photometric patterns in the sky-ground direction is naturally included. Furthermore, a configuration may be adopted in which a photometric value of the omnidirectional image is calculated by setting, based on information regarding the orientation detection unit 64, the horizontal plane along which photometric frames are cut, to a horizontal plane according to the orientation of the camera at the time of imaging.

Also, the horizontal plane along which photometric frames are cut has been described above as a plane passing through the center of the entire sphere. However, a plane along which photometric frames are cut in the horizontal direction may be moved (changed) vertically in the entire sphere, or photometric frames may be cut along a plurality of horizontal planes, in accordance with the height of the camera at the time of imaging and an imaging environment.

Also, although one of planes orthogonal to the horizontal plane along which photometric frames are cut has been described as a plane passing through the optical axis, even in a case where photometric frames are cut along a plurality of planes that do not pass through the optical axis, no problems arise.

Figure 9:
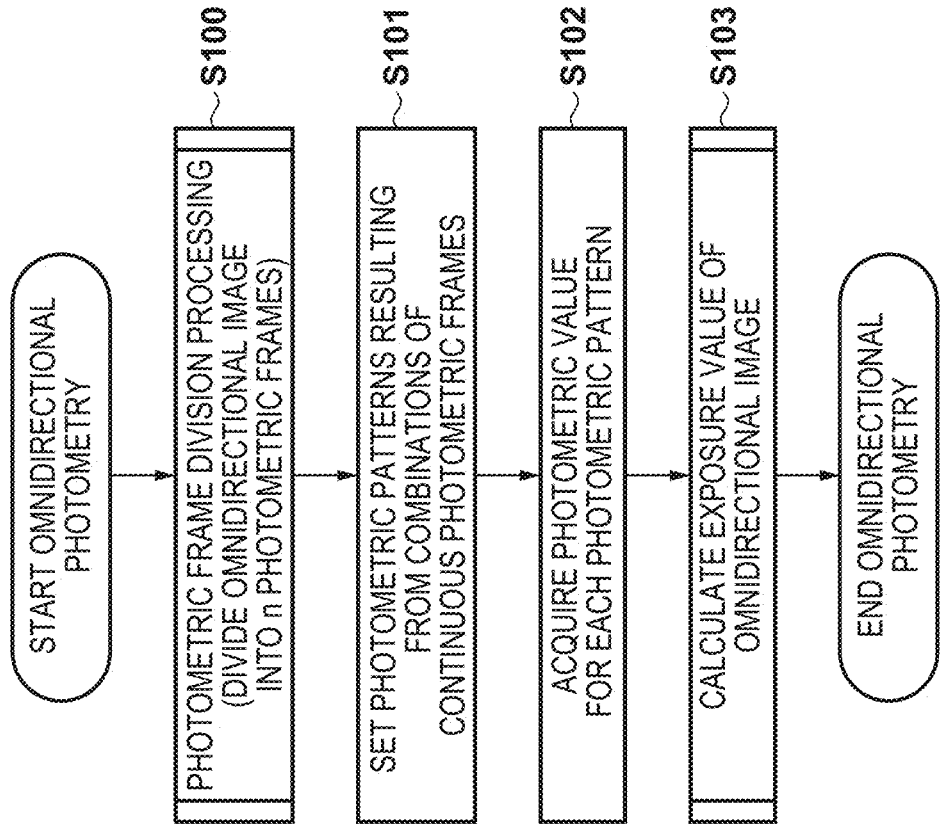
FIG. 9 is a flowchart illustrating photometry processing at the time of imaging the entire sphere in one embodiment.

Next, the flow of processing in this embodiment will be described with reference to FIGS. 9 to 12. FIG. 9 is a flowchart illustrating the flow of the overall photometry processing for capturing an omnidirectional image. It is assumed that omnidirectional image photometry processing below is performed by the system controller 50 executing a program stored in the memory 65, unless explicitly stated otherwise.

First, in step S100, the system controller 50 divides, into n photometric frames, an omnidirectional image obtained by combining images captured for photometry by a plurality of cameras. Photometric frame division processing performed in step S100 will be described later in detail with reference to FIG. 10.

In step S101, as described in FIG. 4, the system controller 50 sets photometric patterns resulting from combinations of adjacent continuous photometric frames, according to a photometric intention from the photometric frames divided in step S100. At this time, the photometric patterns are set such that a portion of a photometric region of a photometric pattern overlap at least a portion of a photometric region of another photometric pattern.

In step S102, the system controller 50 applies the photometric patterns that have been set in step S101 to the omnidirectional image, and acquires photometric values for all of the photometric patterns.

In step S103, the system controller 50 estimates an imaging scene of the omnidirectional image using the photometric values of all of the photometric patterns acquired in step S102, and calculates an exposure value with the photometric value of a photometric pattern including a main subject considered important. Processing for calculating an exposure value for acquiring the omnidirectional image performed in step S103 will be described later in detail with reference to FIG. 11.

Figure 10:
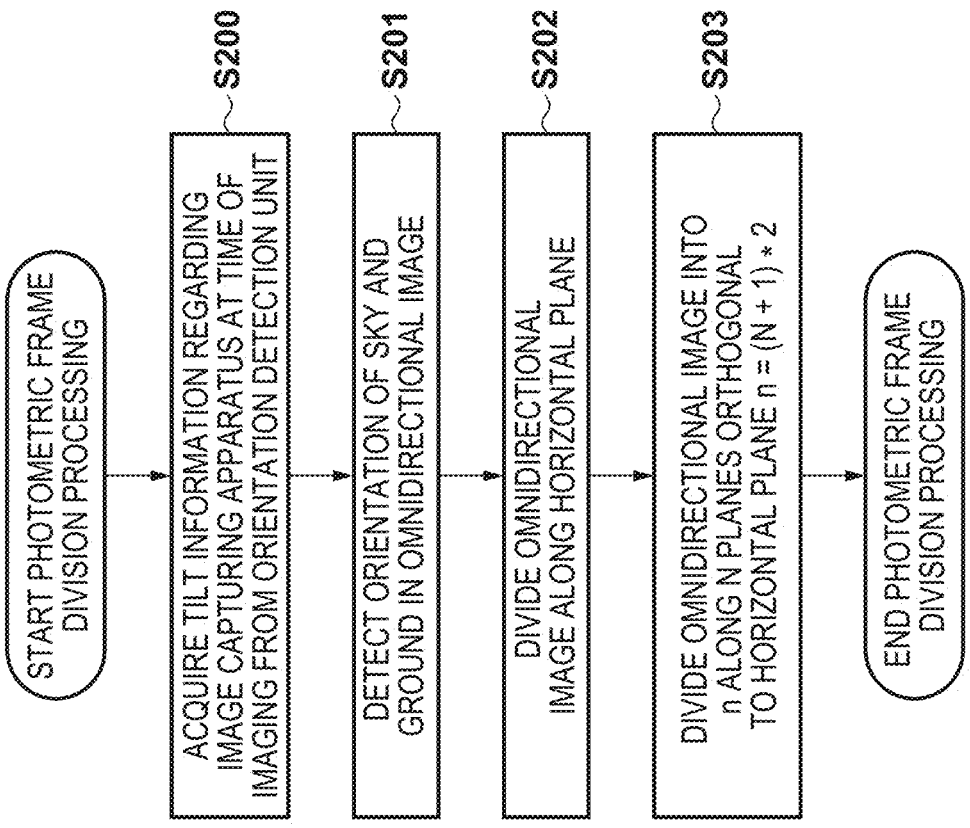
FIG. 10 is a flowchart illustrating processing for dividing an omnidirectional image into a plurality of photometric frames.

FIG. 10 is a flowchart illustrating an example of photometric frame division processing.

First, in S200, the system controller 50 acquires tilt information regarding the omnidirectional image capturing apparatus at the time of imaging based on the information regarding the orientation detection unit 64, and, in step S201, performs omnidirectional image orientation detection at the time of photometry based on this tilt information. At this time, the orientation in the captured image may be changed such that the orientation of the sky and the ground of the omnidirectional image is appropriate, or the tilt information regarding the omnidirectional image may be stored and used as information for photometric frame division performed later.

In step S202, the system controller 50 divides the omnidirectional image vertically along the horizontal plane. At this time, in a case where the orientation in the image has been changed with respect to the orientation of the sky and the ground of the omnidirectional image detected in step S201 such that the omnidirectional image has an appropriate orientation, the entire sphere is divided vertically along the horizontal plane. In a case where the tilt information regarding the omnidirectional image is stored, the omnidirectional image is divided vertically using a horizontal plane inclined according to the tilt information regarding the omnidirectional image.

In step S203, the system controller 50 divides the entire sphere into n along N planes orthogonal to the horizontal plane along which the entire sphere is divided vertically in step S202.

$$n=(N+1)*2\text{(division)}$$

Divided regions of the entire sphere that has been divided into n regions are used as n photometric frames in processing performed in S101 onward shown in FIG. 9.

Figure 11:
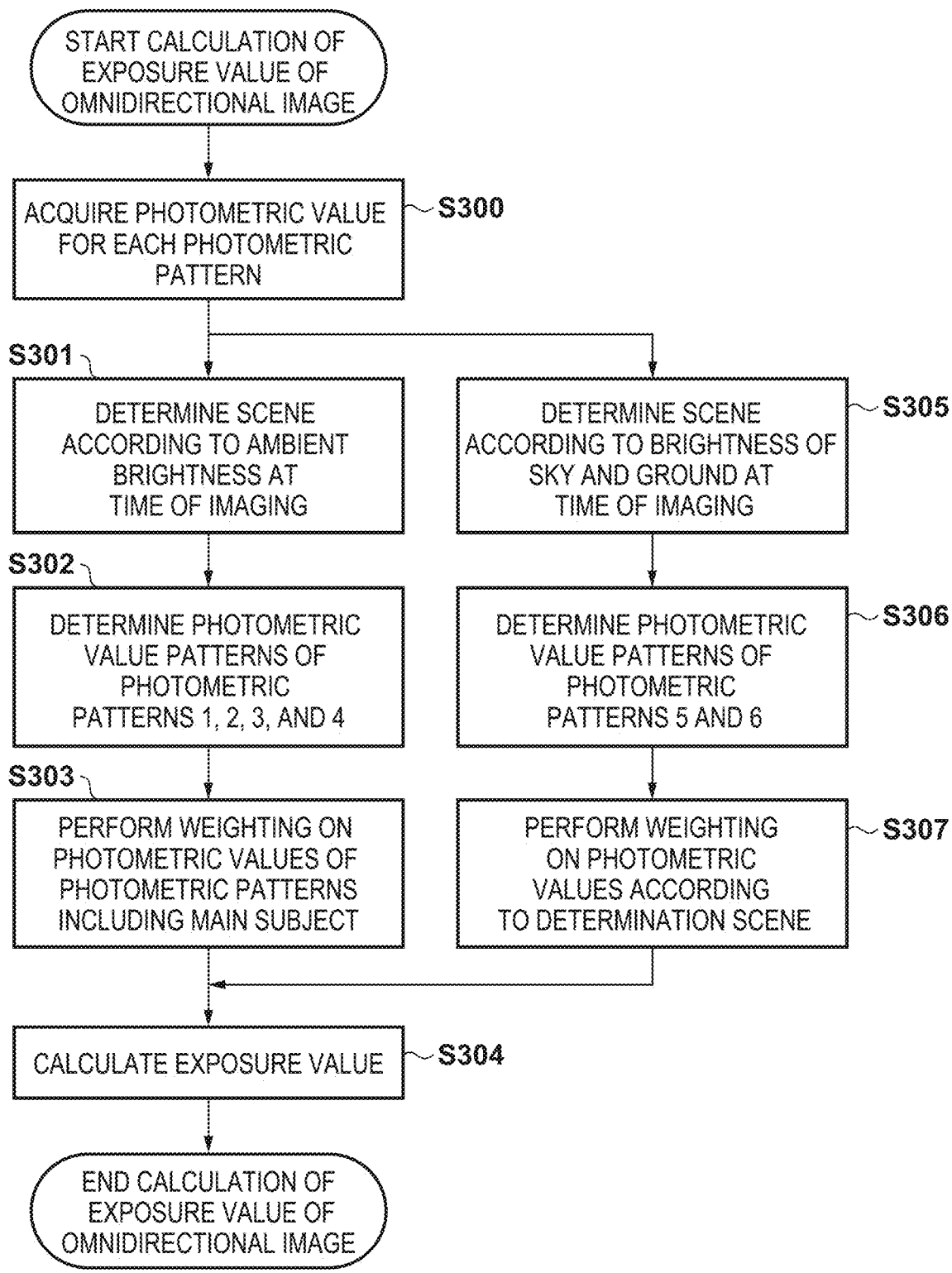
FIG. 11 is a flowchart illustrating processing for calculating exposure values of an omnidirectional image.

FIG. 11 is a flowchart illustrating an example of processing for calculating an exposure value of the omnidirectional images.

In step S300, the system controller 50 acquires photometric values of all of the photometric patterns detected in step S102 shown in FIG. 9, and performs scene determination according to ambient brightness at the time of imaging in step S301 and scene determination according to the brightness of the sky and the ground at the time of imaging in step S305.

In step S302, the system controller 50 performs scene estimation from patterns of the photometric values of the photometric patterns 1, 2, 3, and 4 described in FIG. 4. Also, in step S303, the system controller 50 performs weighting on the photometric values such that a photometric pattern including a main subject and an estimated image region is considered important, according to a scene of the estimation results.

On the other hand, in step S306, the system controller 50 performs scene estimation from patterns of the photometric values of the photometric patterns 5 and 6 described in FIG. 4. Also, in step S307, the system controller 50 performs weighting on photometric values according to a scene of the estimation results.

In step S304, the system controller 50 then performs processing for averaging the weighted photometric values calculated in step S303 and the weighted photometric values calculated in step S307, for example, and calculates an exposure value for acquiring an omnidirectional image.

As described above, in this embodiment, as a result of using a plurality of photometric patterns covering all the ranges of the omnidirectional image, it is possible to perform exposure control when an entire sphere is imaged with high accuracy and little photometric variation caused by the orientation of a camera and an imaging scene.

Note that, in this embodiment, the description has been given such that all the ranges of the omnidirectional image are subjected to photometry and exposure values for all image capturing means are calculated. However, a configuration may be adopted in which, in a case where the luminance range of an imaging scene is too wide and exceeds the dynamic range of the image capturing apparatus, different exposure values are designated for image capturing means and imaging is performed, or and processing for extending the dynamic range of the image capturing apparatus is performed by performing HDR imaging.

Also, in this embodiment, a configuration in which a plurality of image capturing means are provided as image capturing apparatuses capable of capturing omnidirectional images. However, in order to capture an omnidirectional image, an image capturing apparatus capable of capturing omnidirectional images may be an apparatus that combines images captured by a plurality of image capturing apparatuses, or an apparatus that designates exposure conditions for a plurality of image capturing apparatuses and causes the image capturing apparatuses to perform imaging.

Also, although the case where the omnidirectional images in a range of about 360 degrees with respect to the image capturing apparatus are acquired has been described in the above-described embodiment, the present invention is not limited thereto. For example, the above-described configuration may be applied to a case where a wide-angle image such as an omnidirectional image including the zenith is acquired. Also, the above-described configuration may be applied to a case where a wide-angle image such as an omnidirectional image is generated by pseudo-interpolating, through image processing or the like, images while combining a plurality of images to be combined that have been actually captured using an image capturing apparatus. In this case, generation of an omnidirectional image is not limited to that performed inside the image capturing apparatus, and a configuration may be adopted in which an omnidirectional image is combined in an external apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-158570, filed Aug. 27, 2018 which is hereby incorporated by reference herein in its entirety.

What is claimed is:

1. An image capturing apparatus comprising:
an image capturing device configured to capture an image of a subject;
at least one processor or circuit configured to function as the following units:
a photometry unit configured to perform photometry on the subject based on the image obtained using the image capturing device; and
an exposure control unit configured to control an exposure used when an image of the subject is captured to acquire the image, based on a result of photometry performed by the photometry unit,
wherein, when a wide-angle image is acquired using the image capturing device, the photometry unit divides the wide-angle image into a plurality of regions, and acquires a first photometric result of a first photometric region and a second photometric result of a second photometric region, the first photometric region and the second photometric region being obtained by bringing adjacent predetermined regions together, out of the plurality of regions,
when a wide-angle image is acquired, the exposure control unit controls an exposure used when the wide-angle image is acquired, based on at least the first photometric result and the second photometric result, and
the first photometric region is constituted by a region included in the second photometric region and a region that is not included in the second photometric region, out of the plurality of regions.

2. The image capturing apparatus according to claim 1, wherein the image capturing device includes a first image capturing device and a second image capturing device that are oriented in different directions, and
the wide-angle image is an image obtained by coupling images that are respectively obtained by the first image capturing device and the second image capturing device.

3. The image capturing apparatus according to claim 2, wherein the plurality of regions include at least four regions obtained by dividing a sphere to be imaged, along a horizontal plane that is parallel to an optical axis of the first image capturing device and one plane orthogonal to the horizontal plane.

4. The image capturing apparatus according to claim 3, wherein the plurality of regions include at least eight regions obtained by further dividing the sphere to be imaged, along two planes orthogonal to the horizontal plane.

5. The image capturing apparatus according to claim 4, wherein the first image capturing device and the second image capturing device are arranged back to back and image capturing ranges of the first image capturing device and the second image capturing device are located in opposite directions, and
in a case where a side on which the first image capturing device faces is a front side of the image capturing apparatus and a side on which the second image capturing device faces is a rear side of the image capturing apparatus, a region corresponding to the front side and a region corresponding to the rear side do not include regions that are identical to each other, out of the plurality of regions.

6. The image capturing apparatus according to claim 5, wherein the first photometric region is constituted by the region corresponding to the front side, and
the second photometric region is constituted by a portion of the region corresponding to the front side, and a portion of the region corresponding to the rear side.

7. The image capturing apparatus according to claim 4, wherein the horizontal plane is changed according to an orientation of the image capturing apparatus.

8. The image capturing apparatus according to claim 4, wherein the first photometric region and the second photometric region includes, out of the plurality of regions, two or more different regions that are identical to each other, and two or more different regions other than the two or more different regions that are not identical.

9. The image capturing apparatus according to claim 1, wherein the exposure control unit is configured to perform exposure control by performing predetermined weighting on photometric results of a plurality of photometric regions including at least the first photometric region and the second photometric region.

10. The image capturing apparatus according to claim 1, wherein the at least one processor or circuit is configured to further function as
a combining unit configured to generate the wide-angle image by coupling a plurality of images obtained using the image capturing device,
wherein the wide-angle image is an omnidirectional image obtained by capturing an image of a sphere.

11. The image capturing apparatus according to claim 1, wherein the photometry unit is configured to acquire the first photometric result and the second photometric result by collectively measuring, out of the plurality of regions, regions included in the first photometric region and the second photometric region respectively without acquiring a photometric result of each of the regions included in the first photometric region and the second photometric region.

12. The image capturing apparatus according to claim 1, wherein the photometry unit is configured to acquire a photometric result of each of regions included in the first photometric region and the second photometric region, out of the plurality of regions, and acquire the first photometric result and the second photometric result based on the photometric result of each region.

13. A method for controlling an image capturing apparatus provided with an image capturing device configured to capture an image of a subject, the method comprising:
- performing photometry on the subject based on the image obtained using the image capturing device;
- controlling an exposure used when an image of the subject is captured to acquire the image, based on a result of photometry,
- wherein, in the photometry, when a wide-angle image is acquired using the image capturing device, the wide-angle image is divided into a plurality of regions, and a first photometric result of a first photometric region and a second photometric result of a second photometric region are acquired, the first photometric region and the second photometric region being obtained by bringing adjacent predetermined regions together, out of the plurality of regions,
- wherein, in the exposure control, when a wide-angle image is acquired, an exposure used when the wide-angle image is acquired is controlled based on at least the first photometric result and the second photometric result, and
- wherein the first photometric region is constituted by a region included in the second photometric region and a region that is not included in the second photometric region, out of the plurality of regions.

14. A non-transitory computer readable storage medium storing a program for causing a computer to execute steps of a method for controlling an image capturing apparatus provided with an image capturing device configured to capture an image of a subject, the method comprising:
- performing photometry on the subject based on the image obtained using the image capturing device;
- controlling an exposure used when an image of the subject is captured to acquire the image, based on a result of photometry,
- wherein, in the photometry, when a wide-angle image is acquired using the image capturing device, the wide-angle image is divided into a plurality of regions, and a first photometric result of a first photometric region and a second photometric result of a second photometric region are acquired, the first photometric region and the second photometric region being obtained by bringing adjacent predetermined regions together, out of the plurality of regions,
- wherein, in the exposure control, when a wide-angle image is acquired, an exposure used when the wide-angle image is acquired is controlled based on at least the first photometric result and the second photometric result, and
- wherein the first photometric region is constituted by a region included in the second photometric region and a region that is not included in the second photometric region, out of the plurality of regions.

* * * * *